United States Patent
Lim et al.

(10) Patent No.: US 12,282,356 B2
(45) Date of Patent: Apr. 22, 2025

(54) ELECTRONIC DEVICE

(71) Applicant: Samsung Display Co., Ltd., Yongin-si (KR)

(72) Inventors: Kiho Lim, Osan-si (KR); Duk-Woon Choi, Hwaseong-si (KR); Sung-Hyun Kim, Anyang-si (KR); Young-Su Kim, Cheonan-si (KR); Osung Seo, Hwaseong-si (KR); Myeongil Choi, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 203 days.

(21) Appl. No.: 17/990,377

(22) Filed: Nov. 18, 2022

(65) Prior Publication Data

US 2023/0195164 A1 Jun. 22, 2023

(30) Foreign Application Priority Data

Dec. 20, 2021 (KR) .................. 10-2021-0182397

(51) Int. Cl.
*G06F 1/16* (2006.01)
(52) U.S. Cl.
CPC .......... *G06F 1/1616* (2013.01); *G06F 1/1652* (2013.01); *G06F 1/1656* (2013.01); *G06F 1/1681* (2013.01); *G06F 1/1686* (2013.01)
(58) Field of Classification Search
CPC .... G06F 1/1616; G06F 1/1652; G06F 1/1656; G06F 1/1681; G06F 1/1686; G06F 1/1637; G06F 1/1641; G06F 1/1671; G06F 1/1677; H04M 1/0268; H04M 1/0214;

(Continued)

(56) References Cited

U.S. PATENT DOCUMENTS

| | | | | |
|---|---|---|---|---|
| 8,493,726 B2 * | 7/2013 | Visser | ............. | G09F 9/301 361/679.05 |
| 9,071,673 B2 * | 6/2015 | Choi | ............. | G06F 1/1641 |
| 9,179,559 B1 * | 11/2015 | Kim | ............. | G06F 1/1641 |

(Continued)

FOREIGN PATENT DOCUMENTS

| | | |
|---|---|---|
| KR | 101691155 B1 | 1/2017 |
| KR | 1020200130574 A | 11/2020 |
| KR | 102216674 B1 | 2/2021 |

*Primary Examiner* — Anthony M Haughton
*Assistant Examiner* — Theron S Milliser
(74) *Attorney, Agent, or Firm* — CANTOR COLBURN LLP

(57) ABSTRACT

An electronic device includes: a display part including a first non-folding area, a second non-folding area, a first folding area, a third non-folding area, and a second folding area, where the first folding area is disposed between the first non-folding area and the second non-folding area and folded to have a first radius of curvature, and the second folding area is disposed between the second non-folding area and the third non-folding area and folded to have a second radius of curvature greater than the first radius of curvature; and a functional part disposed adjacent to the first non-folding area of the display part and having a predetermined thickness in a thickness direction of the display part. The functional part includes an electronic module disposed on an upper surface of the functional part, and the electronic module includes at least one of a camera module and a driving module.

19 Claims, 11 Drawing Sheets

(58) Field of Classification Search
CPC ..... H04M 1/026; H04M 1/0264; G09F 9/301; H10K 77/111
See application file for complete search history.

(56) References Cited

U.S. PATENT DOCUMENTS

| | | | |
|---|---|---|---|
| D754,254 S | 4/2016 | Dashe | |
| 9,704,932 B2* | 7/2017 | Lee | H10K 59/12 |
| 10,429,894 B2* | 10/2019 | Xia | G06F 1/1641 |
| 10,491,724 B2* | 11/2019 | Lin | H04M 1/0247 |
| 10,921,864 B2* | 2/2021 | Choi | G06F 1/1652 |
| 10,965,796 B2* | 3/2021 | Yang | H04M 1/0235 |
| 2009/0275366 A1* | 11/2009 | Schilling | H04M 1/0247 |
| | | | 455/566 |
| 2012/0264489 A1* | 10/2012 | Choi | H04M 1/0247 |
| | | | 455/566 |
| 2014/0285476 A1* | 9/2014 | Cho | H04M 1/0268 |
| | | | 345/204 |
| 2015/0230349 A1* | 8/2015 | Lee | H10K 77/111 |
| | | | 361/749 |
| 2018/0054501 A1* | 2/2018 | Lin | H04M 1/022 |
| 2019/0320048 A1* | 10/2019 | Yang | G06F 1/1652 |
| 2020/0050318 A1* | 2/2020 | Ure | G06F 1/1652 |
| 2020/0356145 A1* | 11/2020 | Choi | G09F 9/301 |

* cited by examiner

ELECTRONIC DEVICE

This application claims priority to Korean Patent Application No. 10-2021-0182397, filed on Dec. 20, 2021, and all the benefits accruing therefrom under 35 U.S.C. § 119, the content of which in its entirety is herein incorporated by reference.

BACKGROUND

1. Field of Disclosure

The present disclosure relates to an electronic device. More particularly, the present disclosure relates to a foldable electronic device.

2. Description of the Related Art

Various types of electronic devices are being used to provide image information, and a display device including a flexible display panel that is foldable or bendable is being developed. Different from a rigid display device, a flexible display device is able to be folded, rolled, or bent. Since the shape of the flexible display device is changed in various ways, it is convenience to carry the flexible display device regardless of the size of its screen that displays images.

SUMMARY

In a case where a display surface of the flexible display device is exposed to the outside due to the folding or bending operation of the flexible display device, the exposed display surface is likely damaged by external impacts. Accordingly, it is desirable to develop a flexible display device preventing the display surface from being damaged due to the external impacts.

The present disclosure provides an electronic device capable of protecting a display surface thereof, improving a durability thereof, and having a wide display area.

Embodiments of the inventive concept provide an electronic device including: a display part including a first non-folding area, a second non-folding area, a first folding area, a third non-folding area, and a second folding area, where the first folding area is disposed between the first non-folding area and the second non-folding area and folded to have a first radius of curvature, and the second folding area is disposed between the second non-folding area and the third non-folding area and folded to have a second radius of curvature greater than the first radius of curvature; and a functional part disposed adjacent to the first non-folding area of the display part and having a predetermined thickness in a thickness direction of the display part. The functional part includes an electronic module disposed on an upper surface of the functional part, and the electronic module includes at least one of a camera module and a driving module.

The functional part may include a first side surface adjacent to the display part, a second side surface opposite to the first side surface, and a connection surface connecting the second side surface and the upper surface and having a rounded shape.

An upper surface of the second folding area may be disposed adjacent to the first side surface of the functional part when the first folding area and the second folding area are folded.

The first folding area may be folded such that an upper surface of the first non-folding area faces an upper surface of the second non-folding area, and the second folding area is folded such that an upper surface of the third non-folding area is exposed to an outside.

The upper surface of the functional part may be substantially parallel to an upper surface of the display part when the first folding area and the second folding area are unfolded.

The electronic module may include the driving module, and the first and second folding areas may be unfolded from a folded state by an operation of the driving module.

The display part may include a window defining an exterior of the electronic device and including a first non-folding portion corresponding to the first non-folding area, a second non-folding portion corresponding to the second non-folding area, a first folding portion corresponding to the first folding area, a third non-folding portion corresponding to the third non-folding area, and a second folding portion corresponding to the second folding area; a display module disposed under the window and including a first non-folding display portion corresponding to the first non-folding area, a second non-folding display portion corresponding to the second non-folding area, a first folding display portion corresponding to the first folding area, a third non-folding display portion corresponding to the third non-folding area, and a second folding display portion corresponding to the second folding area; and a housing disposed under the display module and accommodating the display module.

The functional part may be connected to the housing.

The electronic module may include the driving module, the housing may include a hinge structure corresponding to each of the first folding display portion and the second folding display portion, and the hinge structure may operate from a fixed state to an open state by an operation of the driving module.

An upper surface of the third non-folding area may define an uppermost surface of the display part when the first folding area and the second folding area are folded.

The predetermined thickness of the functional part may correspond to a height from a lower surface of the functional part to the upper surface of the functional part, and the predetermined thickness may be equal to or greater than a height from a lower surface of the first non-folding area to the upper surface of the third non-folding area when the first folding area and the second folding area are folded.

The electronic device may be operated in one of a first state in which the first folding area and the second folding area are folded, a second state in which the first folding area and the second folding area are unfolded, and a third state in which the first folding area is unfolded and the second folding area is folded.

The functional part may further include a control module to control an operation of the electronic module.

Embodiments of the inventive concept provide an electronic device including: a display part including a first non-folding area, a second non-folding area, a first folding area, a third non-folding area, and a second folding area, where the first folding area is disposed between the first non-folding area and the second non-folding area and folded to have a first radius of curvature, and the second folding area is disposed between the second non-folding area and the third non-folding area and folded to have a second radius of curvature greater than the first radius of curvature; and a functional part disposed adjacent to the first non-folding area of the display part and having a predetermined thickness in a thickness direction of the display part. The functional part includes an upper surface substantially parallel to at least a portion of an upper surface of the display part, a first side surface adjacent to the display part, a second side surface opposite to the first side surface, and a connection surface connecting the second side surface and the upper surface of the functional part and having a rounded shape.

The display part may include: a window defining an exterior of the electronic device and including a first non-folding portion corresponding to the first non-folding area, a second non-folding portion corresponding to the second non-folding area, a first folding portion corresponding to the first folding area, a third non-folding portion corresponding to the third non-folding area, and a second folding portion corresponding to the second folding area; a display module disposed under the window and including a first non-folding display portion corresponding to the first non-folding area, a second non-folding display portion corresponding to the second non-folding area, a first folding display portion corresponding to the first folding area, a third non-folding display portion corresponding to the third non-folding area, and a second folding display portion corresponding to the second folding area; and a housing disposed under the display module and accommodating the display module.

The functional part may be connected to the housing.

An upper surface of the second folding area may be disposed adjacent to the first side surface of the functional part when the first folding area and the second folding area are folded.

Embodiments of the inventive concept provide an electronic device including: a display part including a first non-folding area, a second non-folding area, a first folding area, a third non-folding area, and a second folding area, where the first folding area is disposed between the first non-folding area and the second non-folding area and folded to have a first radius of curvature, and the second folding area is disposed between the second non-folding area and the third non-folding area and folded to have a second radius of curvature greater than the first radius of curvature; and a functional part disposed adjacent to the first non-folding area of the display part and having a predetermined thickness in a thickness direction of the display part. The functional part includes an electronic module disposed on an upper surface thereof, and the electronic device is operated in one of a first state in which the first folding area and the second folding area are folded, a second state in which the first folding area and the second folding area are unfolded, and a third state in which the first folding area is unfolded and the second folding area is folded.

The electronic module may include a driving module, and the first, and second folding areas may be unfolded from the first state by an operation of the driving module.

The first folding area may be folded such that an upper surface of the first non-folding area faces an upper surface of the second non-folding area, and the second folding area may be folded such that an upper surface of the third non-folding area is exposed to an outside.

According to the above, the display surface, which is exposed to the outside when the electronic device is outwardly folded, is protected, and thus, a durability of the electronic device is improved. In addition, the electronic module such as the camera module is not disposed in the display area or the non-display area adjacent to the display area. Accordingly, a wide display area is achieved, and thus, the electronic device includes a larger display part.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
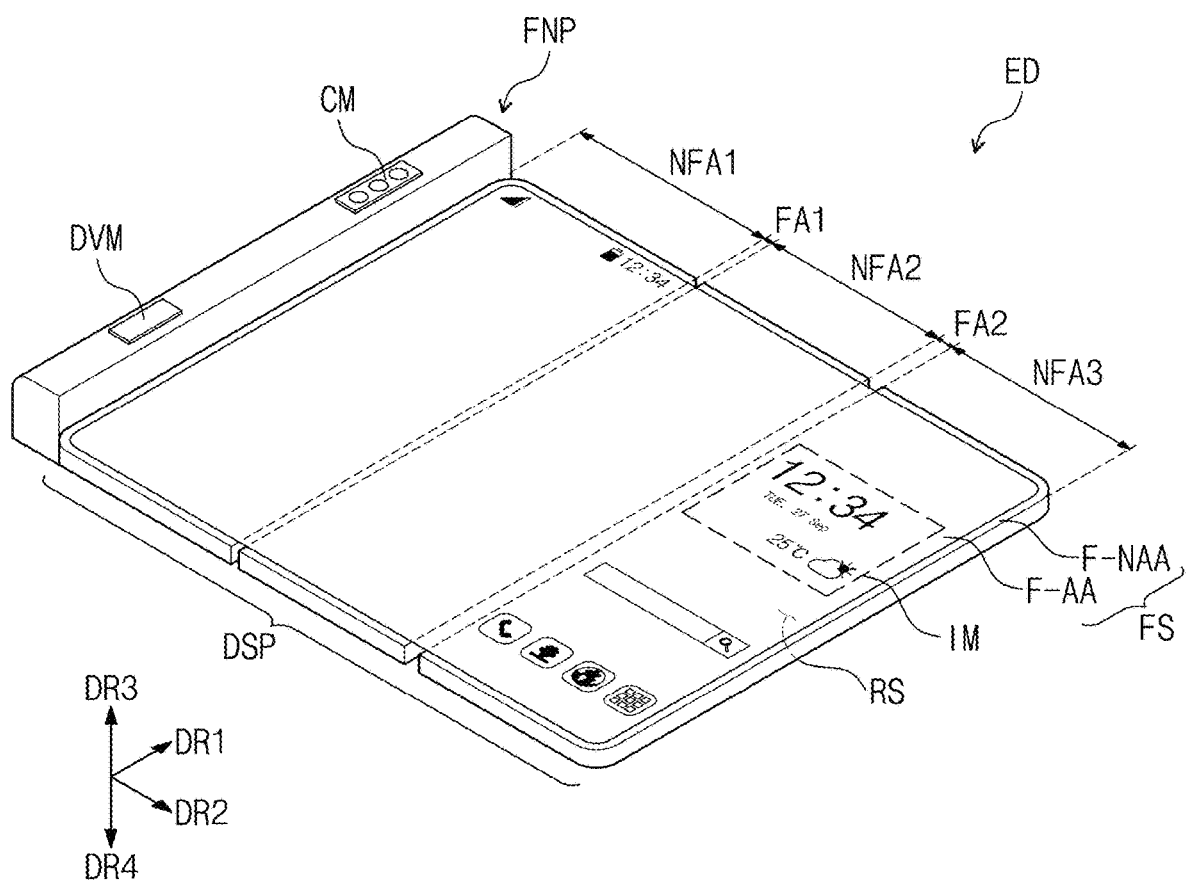
FIG. 1 is a perspective view of an unfolded state of an electronic device according to an embodiment of the present disclosure.

Hereinafter, embodiments of the present disclosure will be described with reference to accompanying drawings.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In the present disclosure, when an element is referred to as being "directly disposed" to another element, there are no intervening elements present between a layer, film region, or substrate and another layer, film, region, or substrate. For example, the term "directly disposed" may mean that two layers or two members are disposed without employing additional adhesive therebetween.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of an electronic device will be described with reference to accompanying drawings.

FIG. 1 is a perspective view of an unfolded state of an electronic device ED according to an embodiment of the present disclosure.

Referring to FIG. 1, the electronic device ED may include a display part DSP and a functional part FNP. The display part DSP may display an image, and the functional part FNP may be disposed adjacent to one side of the display part DSP and may perform various functions.

The display part DSP may include a display surface FS that is substantially parallel to a plane defined by a first direction DR1 and a second direction DR2 crossing the first direction DR1 in an unfolded state thereof. The display part DSP may provide an image IM to a user through the display surface FS. According to the electronic device ED, the display part DSP may display the image IM through the display surface FS that is substantially parallel to each of the first direction DR1 and the second direction DR2 and display the image IM toward a third direction DR3. In the present disclosure, front (or upper) and rear (or lower) surfaces of each components may be defined with respect to a direction in which the image IM is displayed. In the following descriptions, the direction in which the image IM is displayed may be referred to as the third direction DR3, and a fourth direction DR4 may be defined as a direction opposite to the third direction DR3.

The display part DSP may sense an external input applied thereto from an outside. The external input may include various forms of inputs provided from the outside of the display part DSP. For example, the external inputs may include an external input (e.g., a hovering input) applied when approaching close to or in proximity to the display part DSP at a predetermined distance as well as a touch input by a user's body part (e.g., a user's hand). In addition, the external inputs may be provided in the form of force, pressure, temperature, light, etc.

The display surface FS of the display part DSP may include an active area F-AA and a peripheral area F-NAA. The active area F-AA may be activated in response to an electrical signal. The display part DSP may display the image IM through the active area F-AA, and various external inputs may be sensed through the active area F-AA. The peripheral area F-NAA may be defined adjacent to the active area F-AA. The peripheral area F-NAA may have a predetermined color.

The display part DSP may include a rear surface RS facing the display surface FS. According to an embodiment, the rear surface RS may correspond to an external surface of the display part DSP, and a video or a still image may not be displayed through the rear surface RS. However, the present disclosure should not be limited thereto or thereby, and the rear surface RS may serve as a second display surface through which the video or the still image is displayed in another embodiment. In addition, according to an embodiment, the display part DSP may include an electronic module area defined in the rear surface RS. Various electronic modules, such as a camera, a speaker, an optical sensor, and the like, may be disposed in the electronic module area defined in the rear surface RS.

The peripheral area F-NAA may surround the active area F-AA in the display part DSP. Accordingly, the active area F-AA may have a shape that is substantially defined by the peripheral area F-NAA, however, this is merely an example. According to an embodiment, the peripheral area F-NAA may be defined adjacent to only one side of the active area F-AA or may be omitted. The display part DSP of the electronic device ED may include active areas of various shapes and should not be particularly limited.

The display part DSP may include folding areas FA1 and FA2 and non-folding areas NFA1, NFA2, and NFA3. The display part DSP may include a first non-folding area NFA1, a first folding area FA1, a second non-folding area NFA2, a second folding area FA2, and a third non-folding area NFA3, which are sequentially arranged in one direction (e.g., second direction DR2). The first non-folding area NFA1 and the second non-folding area NFA2 may be spaced apart from each other with the first folding area FA1 interposed therebetween, and the second non-folding area NFA2 and the third non-folding area NFA3 may be spaced apart from each other with the second folding area FA2 interposed therebetween. However, the present disclosure should not be limited thereto or thereby. The number of the folding areas and the number of the non-folding areas should not be limited to those shown in FIG. 1. In another embodiment, the number of the folding areas may be three or more, and the number of the non-folding areas may be four or more.

The functional part FNP may be disposed adjacent to one side of the display part DSP and may include an electronic module disposed on an upper surface FNP-US (refer to FIG. 2A) thereof. As used herein, all "upper surface" of a part of the display part DSP is a defined based on the unfolded state of the display part DSP (See FIG. 2B). Therefore, in a folded state, a certain upper surface (e.g., the upper surface of the second non-folding area NFA2 may face downward (See FIG. 3C)). The electronic module may include an electronic component to output or receive an optical signal and an electronic component to control an operation of the electronic device ED. The electronic module may include at least one of a camera module CM and a driving module DVM. The camera module CM may sense an external object provided above the functional part FNP and may receive a natural light signal to take a photo of an external image. The driving module DVM may perform an unfolding operation of the electronic device ED from a folded state. Although not shown in FIG. 1, the electronic module may further include a speaker, an optical sensor, a thermal sensor, etc.

As the electronic module is disposed in the functional part FNP, the display part DSP does not need to include a separate electronic module area in which the electronic module is disposed. Accordingly, the display part DSP may display the image through an entire area of the display surface FS without areas for components performing the functions described above. However, the present disclosure should not be limited thereto or thereby, and a separate electronic module area may be defined in the display surface FS of the display part DSP. In another embodiment, the electronic module area may be defined in the active area F-AA, and in this case, the electronic module area may serve as the display surface through which the video or the still image is displayed when electronic modules disposed in the electronic module area defined in the display part DSP are inactivated.

Figure 2A:
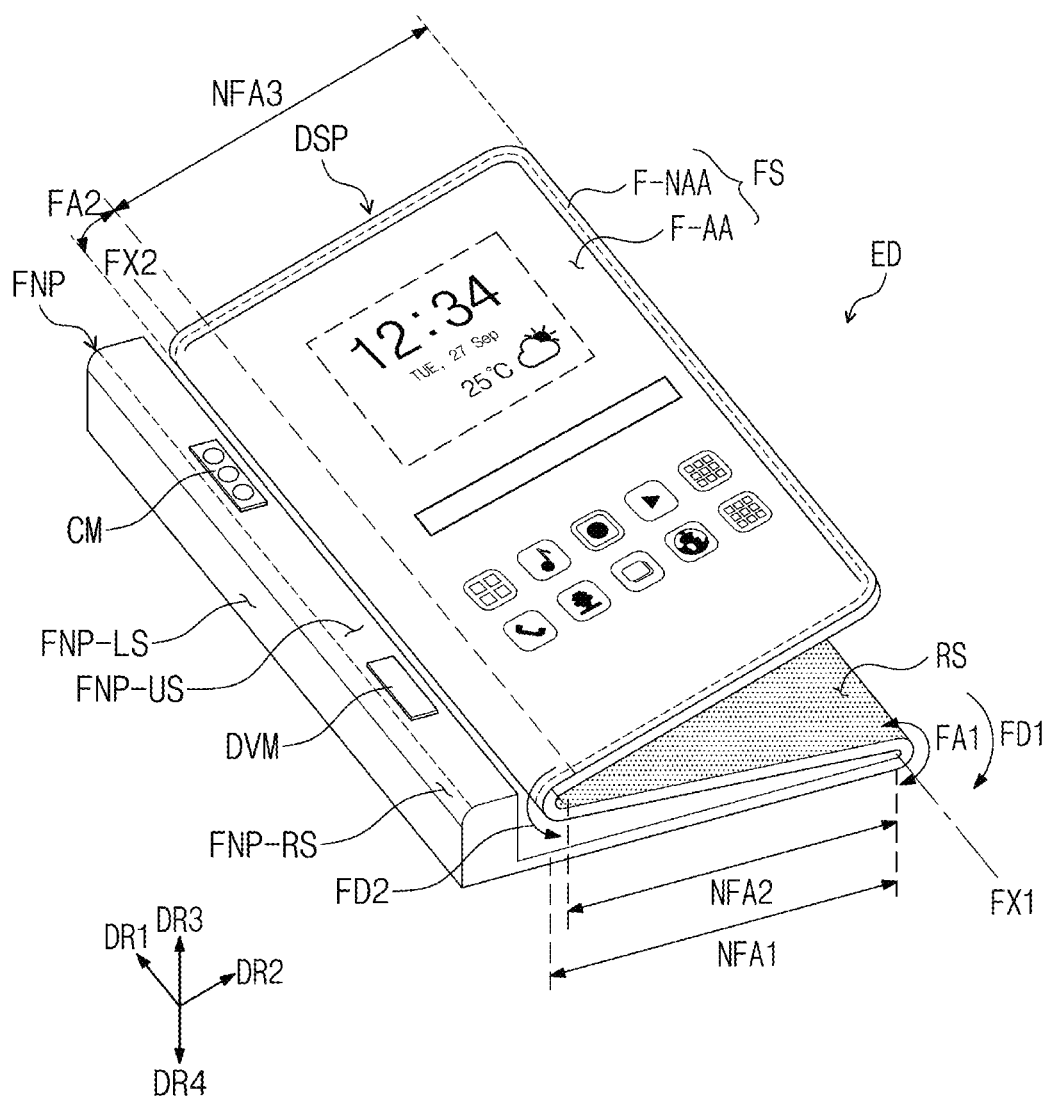
FIG. 2A is a perspective view of a folding state of an electronic device according to an embodiment of the present disclosure.
Figure 2B:
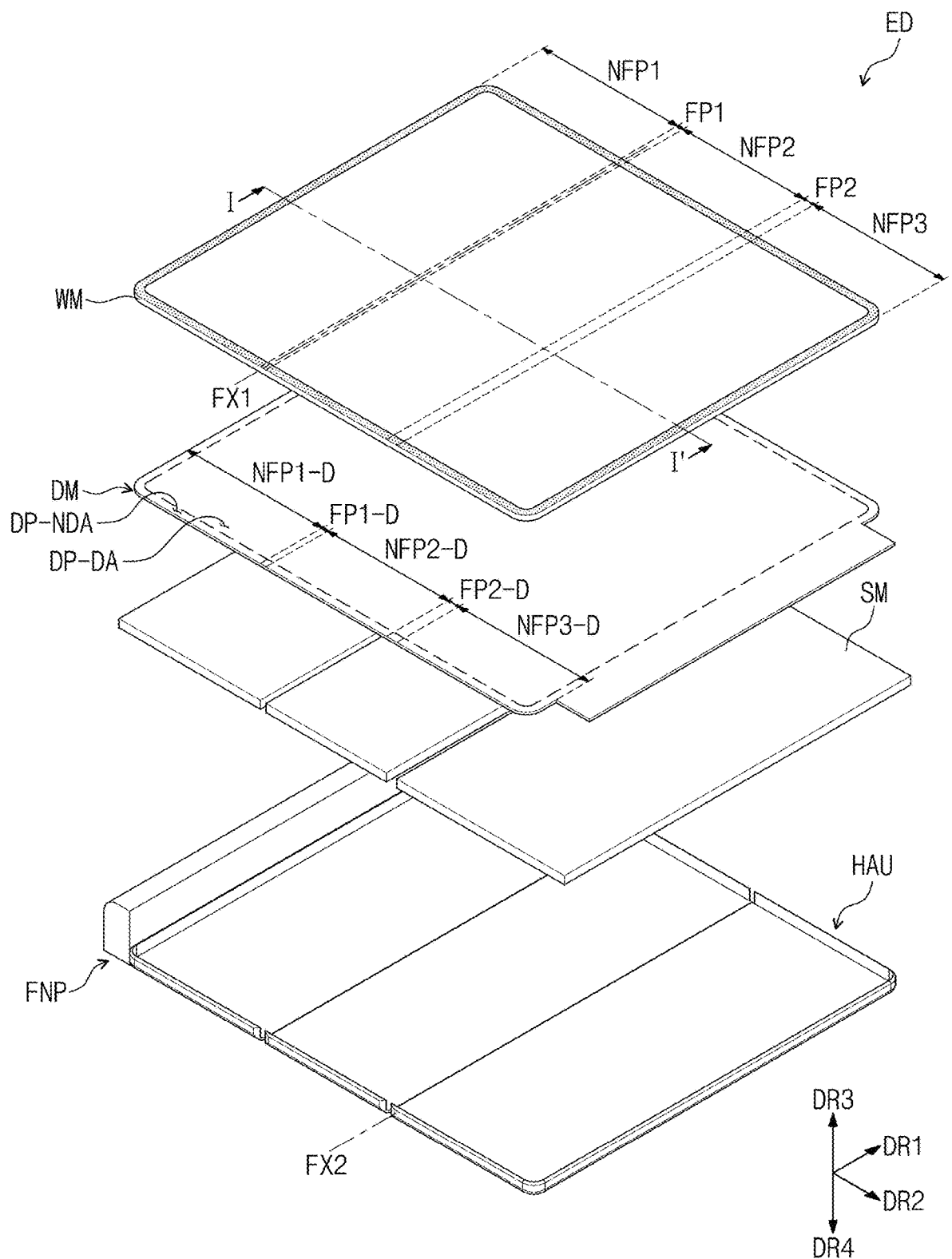
FIG. 2B is an exploded perspective view of an electronic device according to an embodiment of the present disclosure.
Figure 2C:
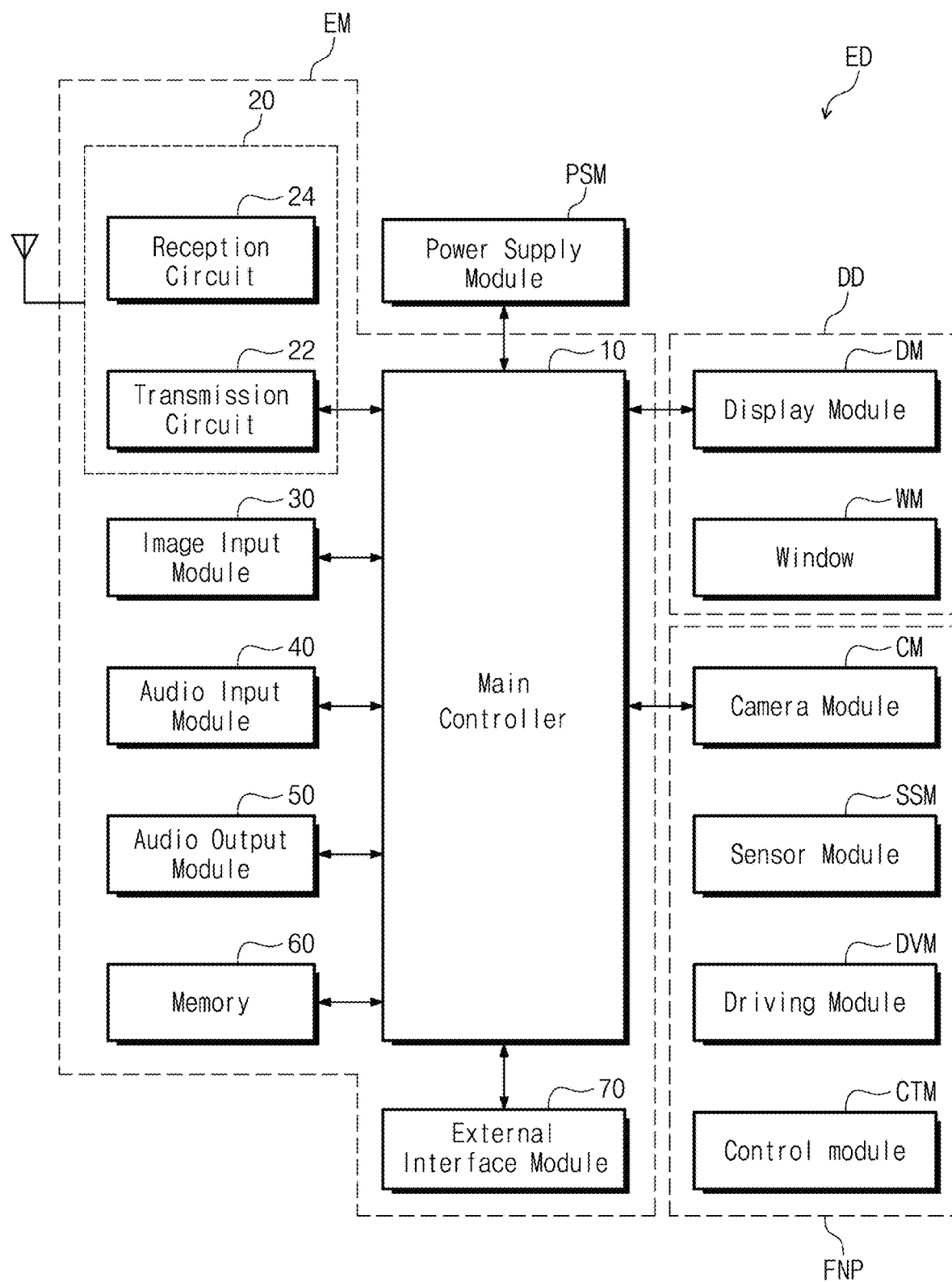
FIG. 2C is a block diagram of an electronic device according to an embodiment of the present disclosure.
Figure 2D:
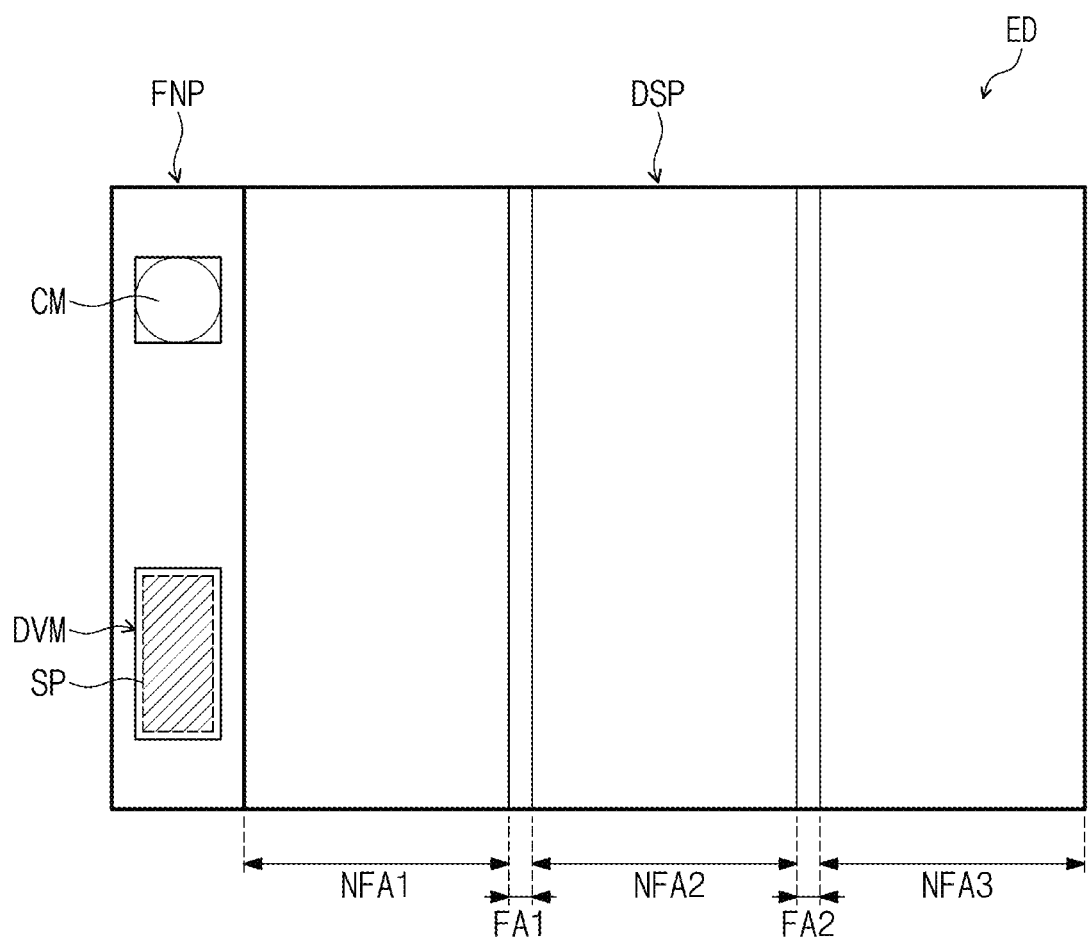
FIG. 2D is a top plan view of an electronic device according to an embodiment of the present disclosure.

FIG. 2A is a perspective view of the electronic device ED which is being folded according to an embodiment of the present disclosure. FIG. 2B is an exploded perspective view of the electronic device ED according to an embodiment of the present disclosure. FIG. 2C is a block diagram of the electronic device ED according to an embodiment of the present disclosure. FIG. 2D is a top plan view of the electronic device ED according to an embodiment of the present disclosure.

Referring to FIGS. 2A to 2D, the electronic device ED may include the first folding area FA1 foldable with respect to a first folding axis FX1 parallel to the first direction DR1 and the second folding area FA2 foldable with respect to a second folding axis FX2 parallel to the first direction DR1 and spaced apart from the first folding axis FX1. The second folding axis FX2 may be spaced apart from the first folding axis FX1 in the second direction DR2. However, the present disclosure should not be limited thereto or thereby, and the first folding axis FX1 and the second folding axis FX2 may be substantially parallel to an arbitrary direction rather than the first direction DR1 in another embodiment.

In the electronic device ED, the first folding area FA1 may be folded in a first folding direction FD1, and the second folding area FA2 may be folded in a second folding direction FD2. According to an embodiment, the first folding direction FD1 may be a direction in which the electronic device ED is folded to allow the display surface of the first non-folding area NFA1 and the display surface of the second non-folding area NFA2 to be adjacent to each other and to face each other, and the second folding direction FD2 may be a direction in which the electronic device ED is folded to allow the display surface of the third non-folding area NFA3 to be exposed to the outside. The display surface of the third non-folding area NFA3 and the display surface of the second non-folding area NFA2 faces opposite direction when folded in the second folding direction FD2.

In the embodiment shown in FIG. 2A, the first folding axis FX1 may be an imaginary axis extending in the first direction DR1 and may be disposed above the display surface FS. In addition, the second folding axis FX2 may be an imaginary axis extending in the first direction DR1 and may be disposed under the rear surface RS.

In the display part DSP, the first folding area FA1 may be inwardly folded (inner-folding) such that the display surface of the first non-folding area NFA1 may be disposed adjacent to the display surface of the second non-folding area NFA2 and may face the display surface of the second non-folding area NFA2. In addition, the second folding area FA2 may be outwardly folded (outer-folding) such that the rear surface of the second non-folding area NFA2 may be disposed adjacent to the rear surface of the third non-folding area NFA3 and may face the rear surface of the third non-folding area NFA3. When the display part DSP is folded, the display surface FS of the third non-folding area NFA3 may be exposed to the outside. In addition, when the display part DSP is folded as shown in FIG. 2A, an upper surface of the first non-folding area NFA1 may disposed adjacent to an upper surface of the second non-folding area NFA2 and may face the upper surface of the second non-folding area NFA2, and an upper surface of the third non-folding area NFA3 may be exposed to the outside. When the display part DSP is folded as shown in FIG. 2A, the upper surface of the third non-folding area NFA3 may define an uppermost surface of the display part DSP.

The functional part FNP may include the upper surface FNP-US on which the electronic modules, such as the camera module CM and the driving module DVM, are disposed and a side surface FNP-LS with a predetermined height. The functional part FNP may include a connection surface FNP-RS connecting the upper surface FNP-US and the side surface FNP-LS. The connection surface FNP-RS may connect the upper surface FNP-US and the side surface FNP-LS and may have a rounded shape. The connection surface FNP-RS may be a curved surface whose slope increases in a direction from the upper surface FNP-US to the side surface FNP-LS.

Referring to FIG. 2B, the display part DSP may include a display module DM and a window WM. The window WM may be disposed above the display module DM, and the window WM may form the display surface FS of the display part DSP. The window WM may include a lower surface DS (refer to FIG. 3A) adjacent to the display module DM and an upper surface US (refer to FIG. 3A) facing the lower surface DS (refer to FIG. 3A) in a thickness direction (i.e., the third direction DR3). According to an embodiment, the electronic device ED may further include a lower module SM disposed under the display part DSP. In an embodiment, the display part DSP may further include a window adhesive layer disposed between the display module DM and the window WM.

The window WM may entirely cover an upper surface of the display module DM. The window WM may have a shape corresponding to a shape of the display module DM.

In the display part DSP of the electronic device ED, the window WM may include an optically transparent insulating material. The window WM may be a glass substrate or a polymer substrate. The window WM may be formed of a glass material. As an example, the window WM may be the glass substrate in which at least a portion is chemically strengthened. According to an embodiment, the window WM may be formed of the glass material and may be used as a cover window of the display part DSP.

The window WM may include a first non-folding portion NFP1, a first folding portion FP1, a second non-folding portion NFP2, a second folding portion FP2, and a third non-folding portion NFP3, which are arranged in the second direction DR2. A radius of curvature of the first folding portion FP1 when the first folding portion FP1 is folded may be smaller than a radius of curvature of the second folding portion FP2 when the second folding portion FP2 is folded. In addition, a width $W_{FA1}$ in the second direction DR2 of the first folding portion FP1 may be smaller than a width $W_{FA2}$ in the second direction DR2 of the second folding portion FP2.

The display module DM may display the image in response to an electrical signal and may transmit/receive information about the external input. The display module DM may include a display area DP-DA and a non-display area DP-NDA. The display area DP-DA may be defined as an area through which the image provided from the display module DM transmits.

The non-display area DP-NDA may be defined adjacent to the display area DP-DA. As an example, the non-display area DP-NDA may surround the display area DP-DA. However, this is merely an example, and the non-display area DP-NDA may be defined in various shapes and should not be particularly limited. According to an embodiment, the display area DP-DA of the display module DM may correspond to at least a portion of the active area F-AA (refer to FIG. 1). In the present disclosure, the expression "an area/portion corresponds to another area/portion" may mean that "an area/portion overlaps another area/portion" in a certain case, but the expression should not be limited to "an area/portion has the same area as another area/portion".

The display module DM may include folding display portions FP1-D and FP2-D and non-folding display portions NFP1-D, NFP2-D, and NFP3-D. The folding display portions FP1-D and FP2-D may correspond to the folding areas FA1 and FA2 (refer to FIG. 1), and the non-folding display portions NFP1-D, NFP2-D, and NFP3-D may correspond to the non-folding areas NFA1, NFA2, and NFA3, respectively (refer to FIG. 1).

A first folding display portion FP1-D may be folded or bent with respect to the first folding axis FX1 extending in the first direction DR1. A second folding display portion FP2-D may be folded or bent with respect to the second folding axis FX2 extending in the first direction DR1. The display module DM may include a first non-folding display portion NFP1-D and a second non-folding display portion NFP2-D spaced apart from the first non-folding display portion NFP1-D with the first folding display portion FP1-D interposed therebetween and may include the second non-folding display portion NFP2-D and a third non-folding display portion NFP3-D spaced apart from the second non-folding display portion NFP2-D with the second folding display portion FP2-D interposed therebetween.

The lower module SM may be disposed under the display module DM and may include a material with a predetermined strength to support the display module DM. In addition, the lower module SM may include various components, such as, a cushion layer, an electromagnetic shielding layer, and a step difference compensation layer, to protect components included in the electronic device ED from external impacts or to complement functions of the components included in the electronic device ED.

The display part DSP may include a housing HAU accommodating the display module DM and the lower module SM. The housing HAU may be coupled with the window WM. Although not shown in figures, the housing HAU may further include a hinge structure to allow the electronic device ED to be easily folded or bent. The hinge structure may be disposed to correspond to each of the first folding display portion FP1-D and the second folding display portion FP2-D. As the hinge structure is fixed, the display part DSP may be maintained in the folded state. The functional part FNP may be connected to the housing HAU.

The window WM may be the cover window disposed on the display module DM. The upper surface of the window WM may define the uppermost surface of the display part DSP.

Referring to FIG. 2C, the electronic device ED may include a display device DD, a control module EM, a power supply module PSM, and the functional part FNP.

The display device DD may generate the image and may sense the external input. The display device DD may include the window WM and the display module DM. The window WM may provide a front surface of the electronic device ED.

Figure 3A:
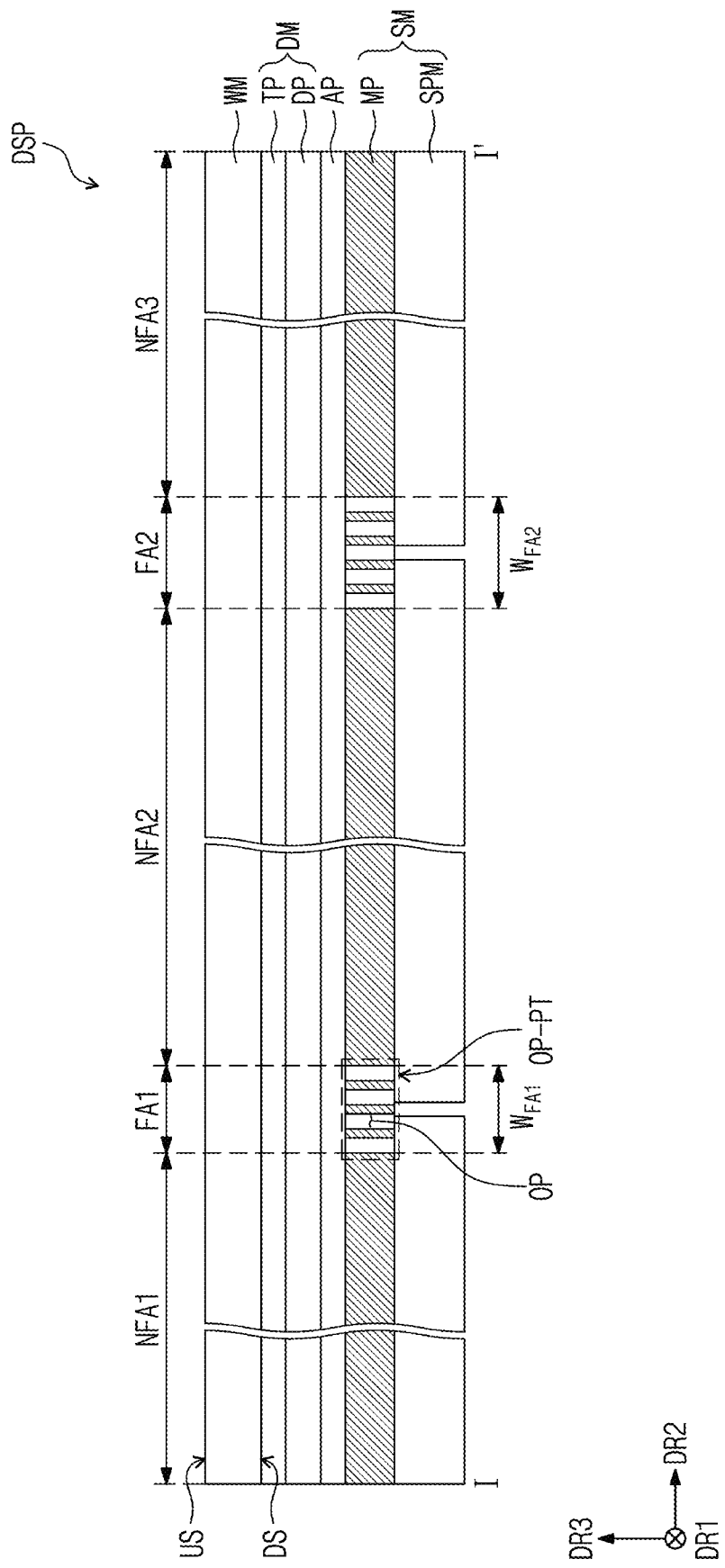
FIG. 3A is a cross-sectional view of some components of an electronic device according to an embodiment of the present disclosure.

The display module DM may include at least a display panel DP (refer to FIG. 3A). The display module DM may further include a plurality of components disposed on and under the display panel DP. A stack structure of the display module DM will be described in detail later.

The control module EM may include at least a main controller 10. The control module EM may include the main controller 10, a wireless communication module 20, an image input module 30, an audio input module 40, an audio output module 50, a memory 60, and an external interface module 70. The modules may be mounted on a circuit board or may be electrically connected to the circuit board via a flexible circuit board. The control module EM may be electrically connected to the power supply module PSM.

The main controller 10 may control an overall operation of the electronic device ED. For example, the main controller 10 may activate or deactivate the display device DD in response to the user input. The main controller 10 may control the image input module 30, the audio input module 40, and the audio output module 50 to meet the user input. The main controller 10 may include at least one microprocessor.

The wireless communication module 20 may transmit/receive a wireless signal to/from other terminals using a Bluetooth or WiFi link. The wireless communication module 20 may transmit/receive a voice signal using a general communication line. The wireless communication module 20 may include a transmission circuit 22 that modulates a signal to be transmitted and transmits the modulated signal and a reception circuit 24 that demodulates the signal applied thereto.

The image input module 30 may process an image signal and may convert the image signal into image data that may be displayed through the display device DD. The audio input module 40 may receive an external audio signal through a microphone in a record mode or a voice recognition mode and may convert the external audio signal to electrical voice data. The audio output module 50 may convert the audio data provided from the wireless communication module 20 or the audio data stored in the memory 60 and may output the converted audio data to the outside.

The external interface module 70 may serve as an interface between the main controller 10 and external devices, such as an external charger, a wired/wireless data port, a card socket (e.g., a memory card and a SIM/UIM card), etc.

The power supply module PSM may supply a power source for the overall operation of the electronic device ED. The power supply module PSM may include a normal battery device.

The housing HAU (refer to FIG. 2B) included in the electronic device ED may accommodate the display module DM, the control module EM, and the power supply module PSM. The housing HAU may be coupled with the window WM. The housing HAU may protect components accommodated therein, such as the display module DM, the control module EM, the power supply module PSM, and the electronic module. The display module DM, the control module EM, the power supply module PSM, and the housing HAU may be included in the display part DSP (refer to FIG. 2A).

The functional part FNP may include the electronic module of which at least a portion is disposed on the upper surface FNP-US (refer to FIG. 2A) of the functional part FNP. The electronic module may be an electronic component that outputs or receives an optical signal or an electronic component that controls an operation of the electronic device ED.

At least a portion of the electronic module may transmit or receive the optical signal on the upper surface of the functional part FNP. In the present embodiment, the electronic module may include the camera module CM. The camera module CM may receive a natural light signal to take a photo of an external object. The electronic module may include a sensor module SSM, such as a proximity sensor or an infrared emission sensor. The sensor module SSM may recognize a part of a user's body, e.g., a fingerprint, an iris, or a face, or may measure a distance between an object and a mobile phone.

The electronic module may include the driving module DVM. The driving module DVM may receive the user input such as a touch or a click operation and may transmit a signal in response to the user input such that the folded state of the display part DSP (refer to FIG. 2A) may be changed to the unfolded state. The electronic module may include an operation control module CTM. The operation control module CTM may be mounted inside the functional part FNP and may control operations of the camera module CM, the sensor module SSM, and the driving module DVM.

Referring to FIGS. 2C and 2D, the functional part FNP may include the camera module CM and the driving module DVM, which are disposed on the upper surface FNP-US, and a sensing area SP may be defined in the driving module DVM. The part of the user's body may be sensed in the sensing area SP by the operation of the sensor module SSM. As an example, the sensing area SP may be an area in which the user's fingerprint is sensed. In the functional part FNP, the driving module DVM may be operated by sensing the user's fingerprint through the sensing area SP and by responding to the input, such as the touch or click, applied by a specific user whose fingerprint is authenticated.

Figure 3B:
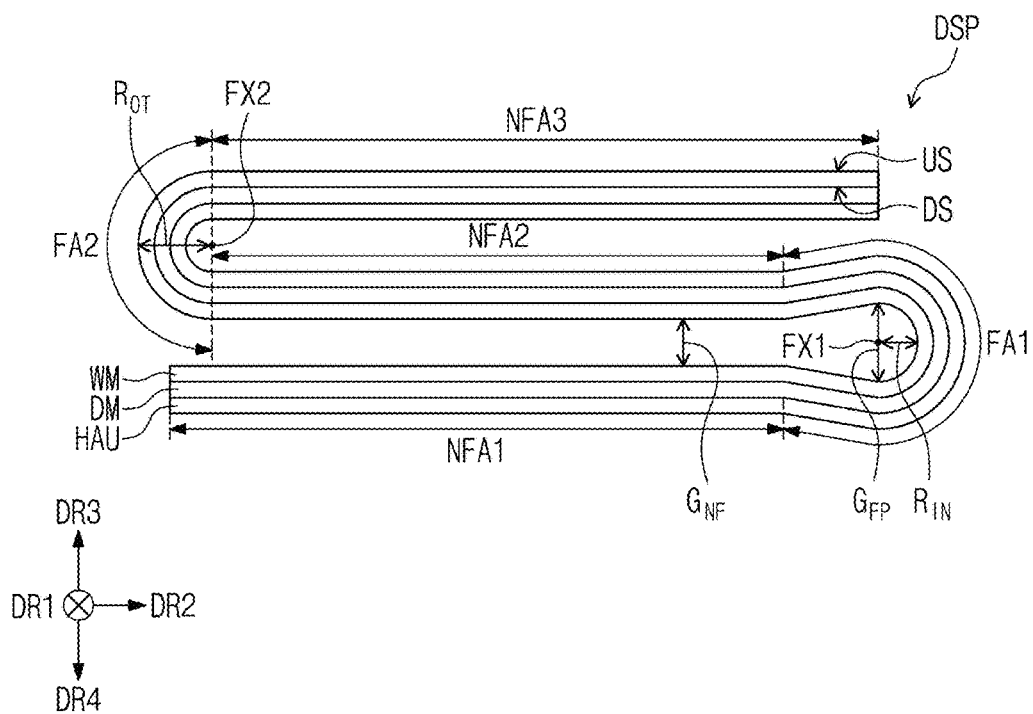
FIGS. 3B and 3C are side views of a folding state of some components of electronic devices according to embodiments of the present disclosure.
Figure 3C:
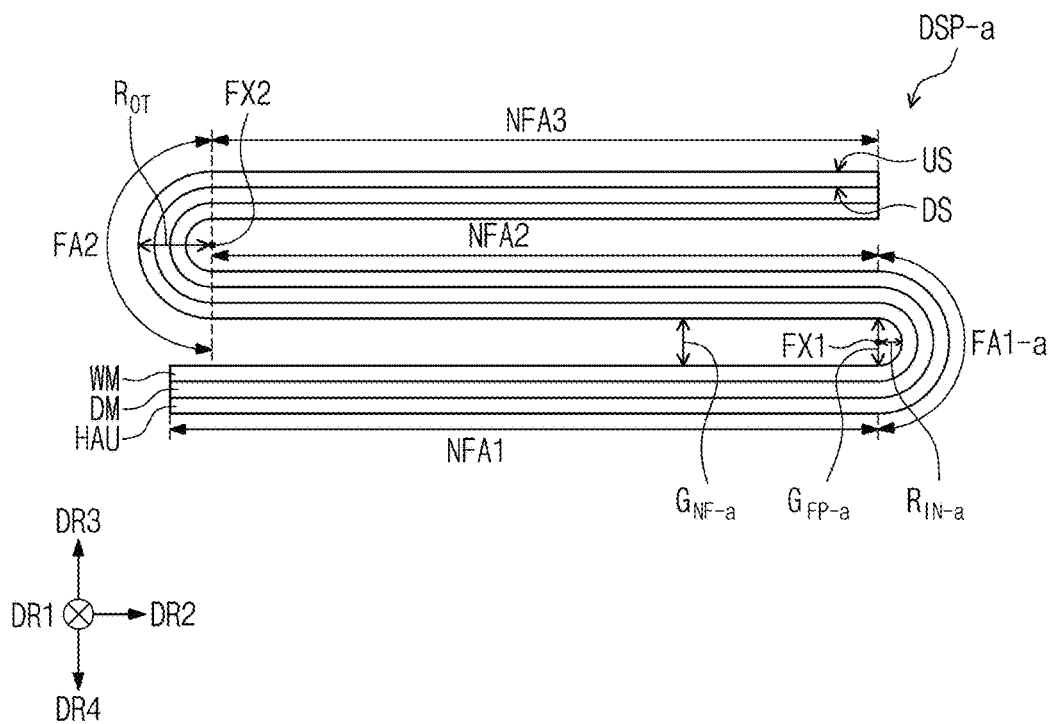

FIG. 3A is a cross-sectional view of some components of the electronic device according to an embodiment of the present disclosure. FIGS. 3B and 3C are side views of a folded state of some components of the electronic devices according to embodiments of the present disclosure. FIGS. 3A to 3C show a cross-section of display parts DSP and DSP-a corresponding to the display part DSP of the electronic device ED shown in FIG. 1.

Referring to FIGS. 3A to 3C, the display parts DSP and DSP-a may include the display module DM and the window WM disposed on the display module DM. In addition, the electronic device ED may further include the lower module SM disposed under the display module DM. According to an embodiment, the electronic device ED may further include an adhesive layer disposed between the display module DM and the window WM.

The window WM may entirely cover the upper surface of the display module DM. The window WM may have the shape corresponding to that of the display module DM. In addition, the electronic device ED may include the housing HAU accommodating the display module DM and the lower module SM. The housing HAU may be coupled with the window WM. Although not shown in figures, the housing HAU may further include the hinge structure to allow the electronic device ED to be easily folded or bent. The window WM may be the cover window disposed on the display module DM. The window WM of the display parts DSP and DSP-a may include the optically transparent insulating material.

Referring to FIGS. 2B and 3A, the window WM may include the first non-folding portion NFP1, the first folding portion FP1, the second non-folding portion NFP2, the second folding portion FP2, and the third non-folding portion NFP3, which are sequentially arranged in the second direction DR2. The radius of curvature of the first folding portion FP1 when the first folding portion FP1 is folded may be smaller than the radius of curvature of the second folding portion FP2 when the second folding portion FP2 is folded. In addition, the width $W_{FA1}$ in the second direction DR2 of the first folding portion FP1 may be smaller than the width $W_{FA2}$ in the second direction DR2 of the second folding portion FP2. The width in the second direction DR2 of each of the first folding portion FP1 and the second folding portion FP2 may be equal to or greater than "pR". In this case, R corresponds to the radius of curvature of each of the first and second folding portions. The window WM will be described in detail later. The width $W_{FA1}$ of the first folding portion FP1 may be equal to or greater than "pX (first radius of curvature)", and the width $W_{FA2}$ of the second folding portion FP2 may be equal to or greater than "pX (second radius of curvature)". The first radius of curvature and the second radius of curvature correspond to radii of curvature of the first folding portion FP1 and the second folding portion FP2, respectively.

According to an embodiment, the display module DM may include at least the display panel DP. The display panel DP may be a light emitting type display panel, however, it should not be particularly limited. For instance, the display panel DP may be an organic light emitting display panel or an inorganic light emitting display panel. A light emitting layer of the organic light emitting display panel may include an organic light emitting material. A light emitting layer of the inorganic light emitting display panel may include a quantum dot and a quantum rod.

The display module DM may further include an input sensor TP. The input sensor TP may be disposed directly on the display panel DP. The input sensor TP may include a plurality of sensing electrodes. The input sensor TP may sense the external input by a self-capacitance method or a mutual capacitance method. The input sensor TP may sense an input applied thereto by an active type input device.

The input sensor TP may be directly formed on the display panel DP through successive process when the display panel DP is manufactured, however, it should not be limited thereto or thereby. According to another embodiment, the input sensor TP may be attached to the display panel DP by an adhesive layer (not shown) after being manufactured separately from the display panel DP.

The lower module SM of the display part DSP may include a support plate MP and a lower support member SPM.

The support plate MP may be disposed under the display module DM. According to an embodiment, the support plate MP may include a metal material or a polymer material. As an example, the support plate MP may be formed of stainless steel, aluminum, or alloys thereof. According to an embodiment, the support plate MP may be formed of a polymer material. The support plate MP may be provided with a plurality of openings OP defined therethrough. The support plate MP may include an opening pattern OP-PT in which the openings OP are defined.

The lower support member SPM may overlap most of the display module DM. The lower support member SPM may include at least one of a support layer, a cushion layer, a shielding layer, and an interlayer adhesive layer. The configuration of the lower support member SPM should not be limited thereto or thereby and may be changed depending on a size, a shape, or operating characteristics of the display part DSP.

In addition, the electronic device ED may further include an adhesive layer AP disposed between the display module DM and the lower module SM. The adhesive layer AP may be an optically clear adhesive ("OCA") film or an optically clear adhesive resin ("OCR") layer.

Referring to FIGS. 3A and 3B, the first folding area FA1 may be folded to have a first radius of curvature $R_{IN}$. The first radius of curvature $R_{IN}$ may correspond to a maximum distance from the first folding axis FX1 to the upper surface of the window WM of the first folding area FA1. The second folding area FA2 may be folded to have a second radius of curvature $R_{OT}$. The second radius of curvature $R_{OT}$ may correspond to a maximum distance from the second folding axis FX2 to the upper surface of the window WM of the second folding area FA2. The second radius of curvature $R_{OT}$ of the second folding area FA2 that is outwardly folded may be greater than the first radius of curvature $R_{IN}$ of the first folding area FA1 that is inwardly folded.

A gap $G_{FP}$ between portions of the upper surface of the window WM, which face each other, of the first folding area FA1 that is inwardly folded in the electronic device ED shown in FIG. 3B may be greater than a gap $G_{NF}$ between the upper surface of the window WM in the first non-folding area NFA1 and the upper surface of the window WM in the second non-folding area NFA2, which face each other in the folded state. The gap $G_{FP}$ between the portions of the upper surface of the window WM, which face each other, of the first folding area FA1 that is inwardly folded in the electronic device ED may increase in a direction from the first and second non-folding areas NFA1 and NFA2 to the first folding axis FX1. When viewed in a plane defined by the second direction DR2 and the third direction DR3, the first folding area FA1 may have a drop shape. The gap $G_{NF}$ between the upper surface of the window WM in the first non-folding area NFA1 and the upper surface of the window WM in the second non-folding area NFA2, which face each other in the folded state, may be smaller than two times of the first radius of curvature $R_{IN}$.

The second folding area FA2 may have a U shape when viewed in the plane defined by the second direction DR2 and the third direction DR3. When the first folding area FA1 and the second folding area FA2 are folded as shown in FIG. 3B, the first radius of curvature $R_{IN}$ may be about 2.5 millimeters (mm), and the second radius of curvature $R_{OT}$ may be about 4.0 mm, however, the present disclosure should not be limited thereto or thereby. According to another embodiment, the first radius of curvature RN and the second radius of curvature $R_{OT}$ may be changed depending on the thickness of the electronic device.

FIG. 3C is a side surface of a folded state of the display part DSP-a according to an embodiment of the present disclosure. The display part DSP-a shown in FIG. 3C may have substantially the same structure and function as those of the display part DSP shown in FIG. 3B except a folded shape of a first folding area FA1-a. In the display part DSP-a, the first folding area FA1-a may be inwardly folded such that a display surface of a first non-folding area NFA1 may face a display surface of a second non-folding area NFA2, and a second folding area FA2 may be outwardly folded such that a rear surface of the second non-folding area NFA2 may face a rear surface of a third non-folding area NFA3.

Referring to FIG. 3C, the first folding area FA1-a may be folded to have a first radius of curvature $R_{IN-a}$. The first radius of curvature $R_{IN-a}$ may correspond to a maximum distance from a first folding axis FX1 to an upper surface of a window WM of the first folding area FA1-a. The second folding area FA2 may be folded to have a second radius of curvature $R_{OT}$. The second radius of curvature $R_{OT}$ may correspond to a maximum distance from a second folding axis FX2 to the upper surface of the window WM of the second folding area FA2. The second radius of curvature $R_{OT}$ of the second folding area FA2 that is outwardly folded may be greater than the first radius of curvature $R_{IN-a}$ of the first folding area FA1-a that is inwardly folded. In addition, the first radius of curvature $R_{IN-a}$ of the first folding area FA1-a shown in FIG. 3C may be smaller than the first radius of curvature RN of the first folding area FA1 shown in FIG. 3B.

In the display part DSP-a shown in FIG. 3C, a gap $G_{FP-a}$ between portions of the upper surface of the window WM, which face each other, of the first folding area FA1-a that is inwardly folded may be the same as a gap $G_{NF-a}$ between the upper surface of the window WM in the first non-folding area NFA1 and the upper surface of the window WM in the second non-folding area NFA2, which face each other in the folded state. The first folding area FA1-a may have a U shape when viewed in a plane defined by the second direction DR2 and the third direction DR3. The gap $G_{NF-a}$ between the upper surface of the window WM in the first non-folding area NFA1 and the upper surface of the window WM in the second non-folding area NFA2, which face each other in the folded state, may be two times the first radius of curvature $R_{IN-a}$. When the first folding area FA1-a and the second folding area FA2 are folded as shown in FIG. 3C, the first radius of curvature $R_{IN-a}$ may be about 1.5 mm, and the second radius of curvature $R_{OT}$ may be about 4.0 mm, however, the present disclosure should not be limited thereto or thereby. The first radius of curvature $R_{IN-a}$ and the second radius of curvature $R_{OT}$ may be changed depending on the thickness of the electronic device.

Figure 4:
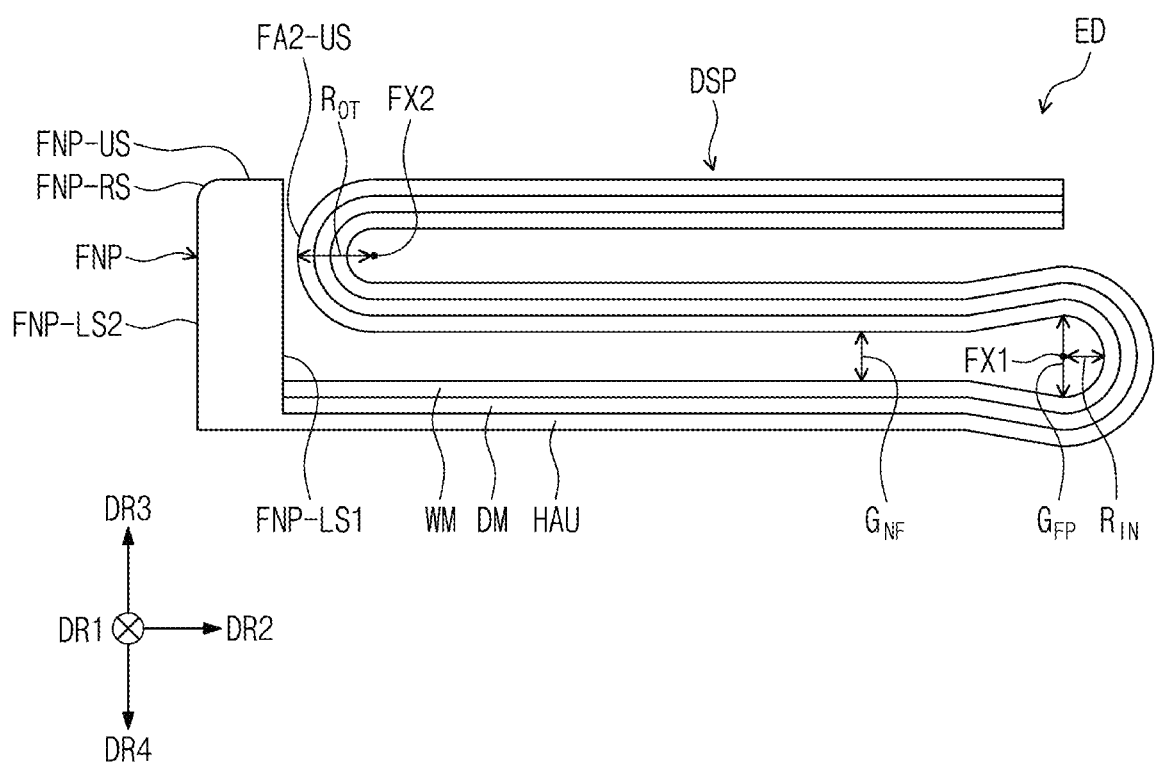
FIG. 4 is a side view of an electronic device according to an embodiment of the present disclosure.

FIG. 4 is a side view of the electronic device ED according to an embodiment of the present disclosure. FIG. 4 shows a folded state of the display part DSP included in the electronic device ED. In FIG. 4, the display part DSP is folded in the shape shown in FIG. 3B, however, according to another embodiment, the display part DSP shown in FIG. 4 may be folded in the shape shown in FIG. 3C.

Referring to FIGS. 3B and 4, the electronic device ED may include the display part DSP and the functional part FNP, and the functional part FNP may be disposed adjacent to one side of the display part DSP. The functional part FNP may be disposed adjacent to the first non-folding area NFA1 of the display part DSP. The functional part FNP may be connected to the housing HAU. The functional part FNP may be provided integrally with a portion of the housing HAU.

The functional part FNP may have a predetermined height (i.e., thickness) in the third direction DR3. The functional part FNP may include the upper surface FNP-US, a first side surface FNP-LS1, a second side surface FNP-LS2, and the connection surface FNP-RS. The first side surface FNP-LS1 of two side surfaces of the functional part FNP may be a surface adjacent to the display part DSP, and the second side surface FNP-LS2 of the two side surfaces of the functional part FNP may be a surface spaced apart from the display part DSP.

The connection surface FNP-RS may connect the upper surface FNP-US and the second side surface FNP-LS2. The connection surface FNP-RS may have a rounded shape in a cross-sectional view (e.g., view from the first direction DR1). The connection surface FNP-RS may be a curved surface whose slope increases in a direction from the upper surface FNP-US to the side surface FNP-LS. As the connection surface FNP-RS has the rounded shape, the user may feel more comfortable when holding the functional part FNP of the electronic device ED.

In the folded state of the display part DSP, the functional part FNP may be disposed adjacent to a portion of the display part DSP and may protect the display part DSP. According to an embodiment, when the display part DSP is folded, an upper surface FA2-US in the second folding area FA2 of the display part DSP may be disposed adjacent to the functional part FNP. The upper surface FA2-US of the second folding area FA2 may be disposed adjacent to the first side surface FNP-LS1 of the functional part FNP.

The functional part FNP may have the predetermined height, and the height of the functional part FNP may be equal to or greater than the height of the display part DSP when the display part DSP is folded. According to an embodiment, the height of the functional part FNP may correspond to a distance from a lower surface of the functional part FNP to the upper surface FNP-US, and the height of the display part DSP in the folded state may correspond to a distance from the lower surface of the first non-folding area NFA1 of the display part DSP to the upper surface of the third non-folding area NFA3 of the display part DSP. As the height of the functional part FNP is equal to or greater than the height of the display part DSP when the display part DSP is folded, the second folding area FA2 disposed adjacent to the functional part FNP may be effectively protected.

The electronic device ED may include the display part DSP that is folded multiple times, and the functional part FNP including the electronic module performing various functions may be disposed at one side of the display part DSP. The functional part FNP may be disposed adjacent to a portion of the display surface FS that is exposed to the outside in the folded portion of the display part DSP, i.e., the upper surface FA2-US of the second folding area FA2 shown in FIG. 3B, and thus, the functional part FNP may protect the upper surface FA2-US of the second folding area FA2. The electronic device ED may protect the display surface FS exposed to the outside in the folded state from external impacts, so the durability of the electronic device ED may be improved. In addition, the electronic device ED may include the electronic module disposed on the upper surface of the functional part FNP and performing various functions, such as, the camera module, the driving module, and the sensor module. Accordingly, the display part DSP does not need to include the separate area in which the electronic module is disposed, and thus, the display area may increase.

Figure 5A:
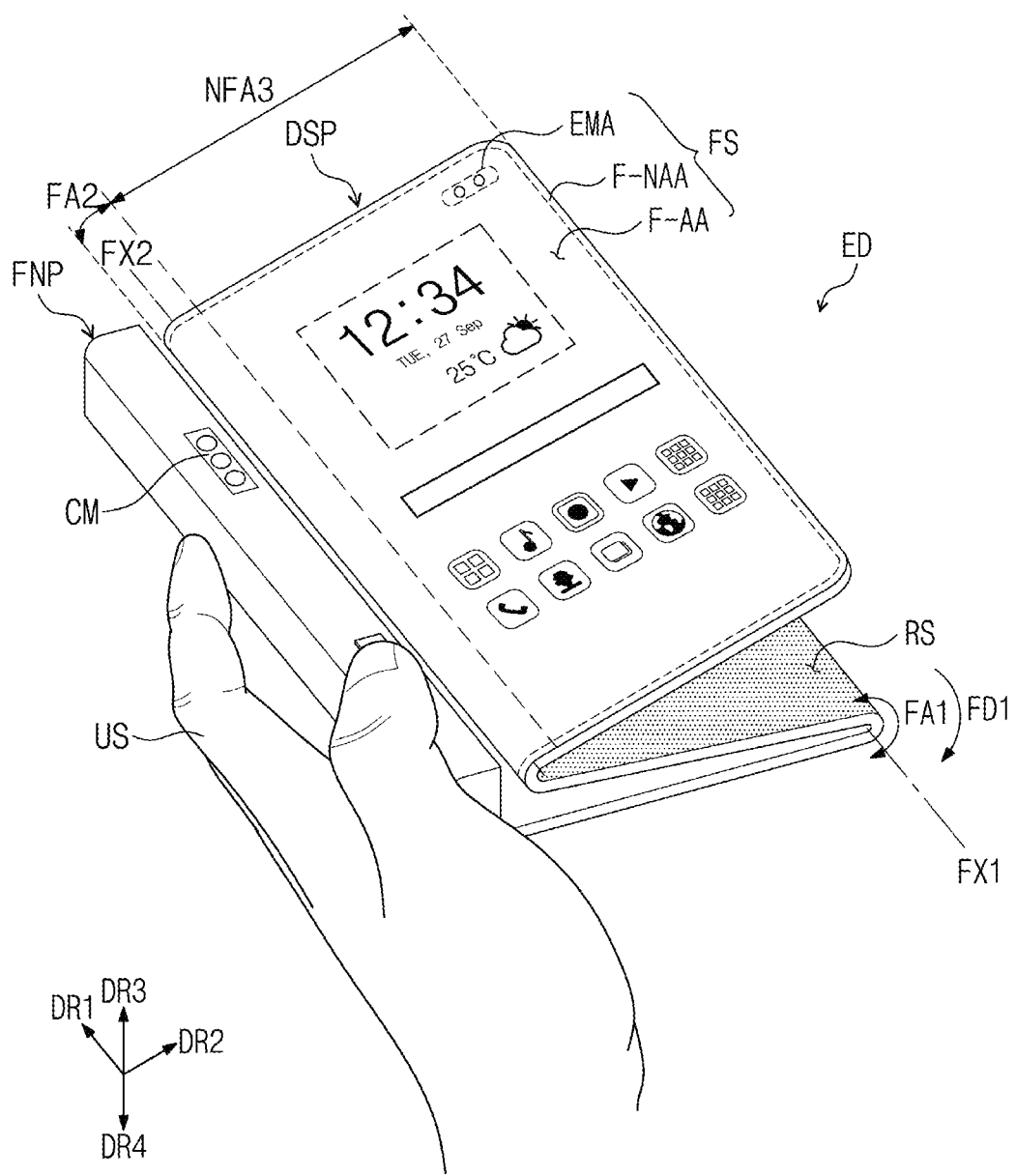
FIG. 5A is a perspective view of an electronic device being in used in a folded state according to an embodiment of the present disclosure.
Figure 5B:
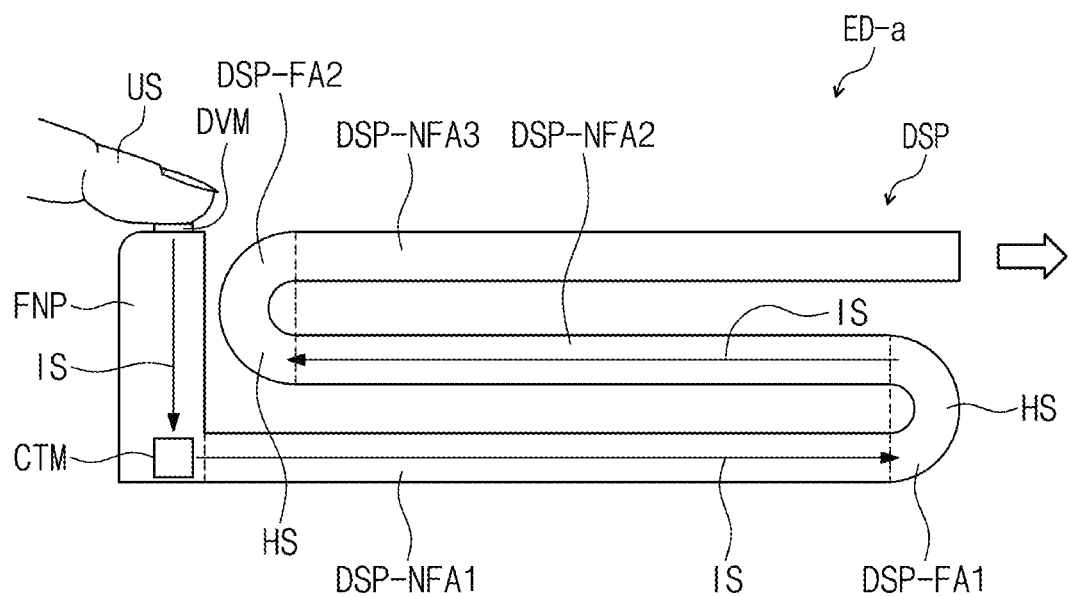
FIGS. 5B and 5C are cross-sectional views of electronic devices operating from one state to another state according to an embodiment of the present disclosure.
Figure 5C:
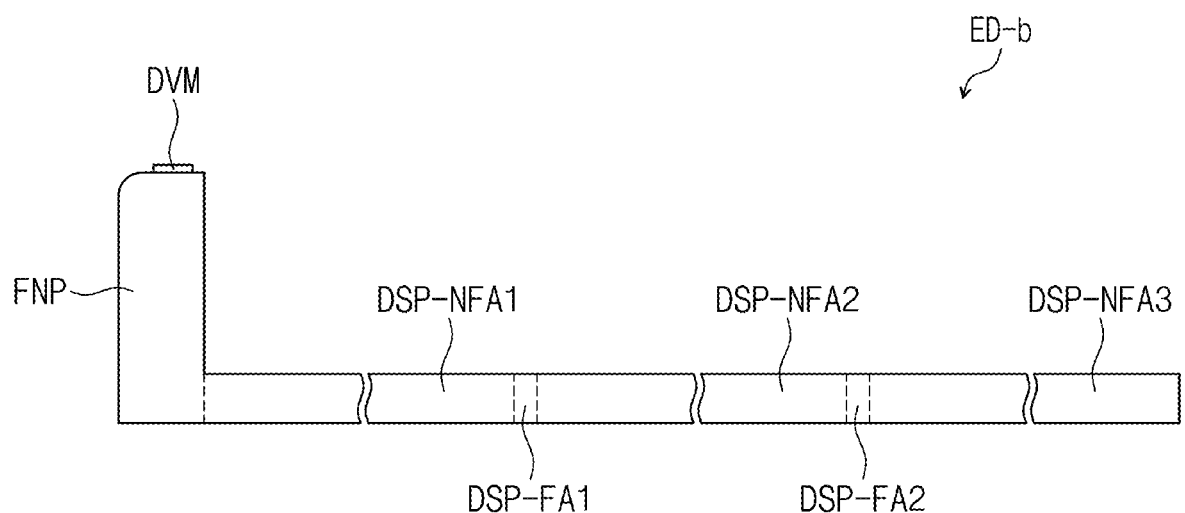
Figure 6:
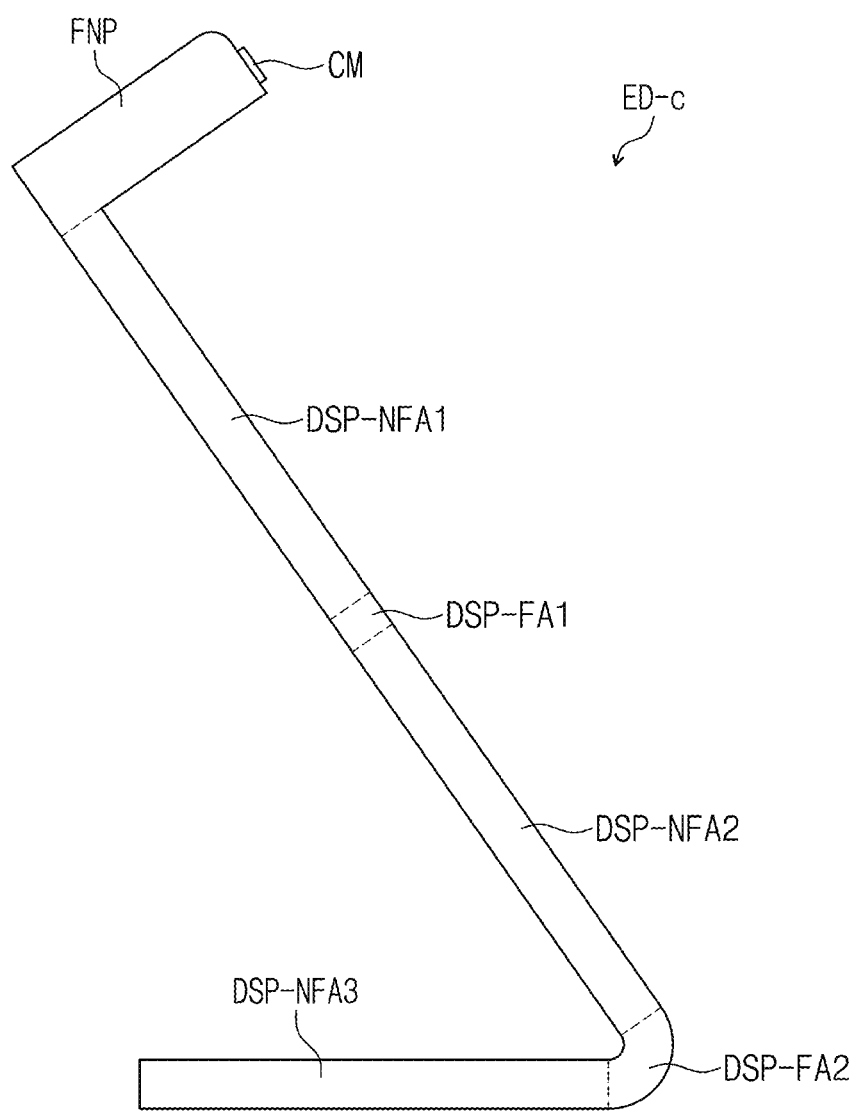
FIG. 6 is a cross-sectional view of another operating state of an electronic device according to an embodiment of the present disclosure.

FIG. 5A is a perspective view of an electronic device ED being in use in a folded state according to an embodiment of the present disclosure. FIGS. 5B and 5C are cross-sectional views of electronic devices ED-a and ED-b, which operate from one state to another state according to an embodiment of the present disclosure. FIG. 6 is a cross-sectional view of another operating state of an electronic device ED-c according to an embodiment of the present disclosure. In FIGS. 5A to 5C and 6, the same reference numerals denote the same element in FIGS. 1 to 4, and thus, detailed descriptions of the same elements will be omitted.

Referring to FIG. 5A, the user US may hold the functional part FNP when the electronic device ED is folded. In the state where the functional part FNP is gripped by the user US, the electronic device ED may be operated when the user US touches or clicks the driving module DVM disposed on the upper surface FNP-US (refer to FIG. 2A) of the functional part FNP. According to an embodiment, the sensing area SP (refer to FIG. 2D) may be defined in the driving module DVM, and thus, the electronic device ED may recognize the specific user whose fingerprint is authenticated.

FIGS. 5B, 5C, and 6 show the display part DSP divided into portions to correspond to the areas defined in FIGS. 3A to 3C. In the present embodiment, a portion of the display part DSP corresponding to the first non-folding area NFA1 is shown as a first non-folding portion DSP-NFA1, a portion of the display part DSP corresponding to the first folding area FA1 is shown as a first folding portion DSP-FA1, a portion of the display part DSP corresponding to the second non-folding area NFA2 is shown as a second non-folding portion DSP-NFA2, a portion of the display part DSP corresponding to the second folding area FA2 is shown as a second folding portion DSP-FA2, and a portion of the display part DSP corresponding to the third non-folding area NFA3 is shown as a third non-folding portion DSP-NFA3.

Referring to FIGS. 5A to 5C, the driving module DVM of the electronic module disposed on the upper surface of the functional part FNP may operate the display part DSP in response to the touch or click operation by the user US. When a signal is applied to the driving module DVM, the state of the display part DSP may be changed from the folded state to the unfolded state. In more detail, when the input of the user US is applied to the driving module DVM in a state where each of the first folding portion DSP-FA1 and the second folding portion DSP-FA2 of the display part DSP is folded, both the first folding portion DSP-FA1 and the second folding portion DSP-FA2 may be unfolded, and the state of the electronic device may be changed from the folded state of the electronic device ED-a to the unfolded state of the electronic device ED-b.

When the input is applied to the driving module DVM by the user US, the operation control module CTM (refer to FIG. 2C) included in the functional part FNP may receive an input signal IS corresponding to the input by the user US and may transmit the input signal IS to the display part DSP to unfold the first folding portion DSP-FA1 and the second folding portion DSP-FA2. The unfolding operation of the first folding portion DSP-FA1 and the second folding portion DSP-FA2 may be performed as the hinge structure HS included in the housing HAU (refer to FIG. 2B) of the display part DSP operates from a fixed state (i.e., folded state) to an open state. According to an embodiment, when the hinge structure HS operates from the fixed state to the open state, the display part DSP may be fully unfolded as shown in FIG. 5C by an elasticity of the display module DM (refer to FIG. 2B) included in the display part DSP or an elasticity of a separate elastic member such as a spring. According to an embodiment, when the hinge structure HS operates from the fixed state to the open state, the display part DSP may not be completely unfolded and may be in a state where a folding degree is reduced to increase the radius of curvature of each of the first folding portion DSP-FA1 and the second folding portion DSP-FA2. Then, the user US may perform an additional operation, such as manually expanding the display part DSP, to completely unfold the display part DSP as shown in FIG. 5C.

Referring to FIG. 6, when the electronic device ED-c is being in use, only a part of the folding portion may be folded, and the other part of the folding portion may be operated in the unfolded state. According to an embodiment, when the electronic device ED-c is being in use, the second folding portion DSP-FA2 may be folded, and first folding portion DSP-FA1 may be operated in the unfolded state. In this case, the second folding portion DSP-FA2 may not be fully folded as shown in FIG. 5B and may be folded with a radius of curvature larger than that shown in FIG. 5B. When the electronic device ED-c is being used, the third non-folding portion DSP-NFA3 may be placed as a bottom surface, and the second folding portion DSP-FA2 may be partially folded to fix the functional part FNP on which the camera module CM is disposed to a predetermined height. Accordingly, when the user US takes a picture using the camera module CM, the user US may take a picture at a predetermined height in the fixed state without additional auxiliary equipment, and thus, the convenience of using the electronic device may be improved.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. An electronic device comprising:
   a display part comprising a first non-folding area, a second non-folding area, a first folding area, a third non-folding area, and a second folding area, wherein the first folding area is disposed between the first non-folding area and the second non-folding area and folded to have a first radius of curvature, and the second folding area is disposed between the second non-folding area and the third non-folding area and folded to have a second radius of curvature greater than the first radius of curvature; and
   a functional part disposed adjacent to the first non-folding area of the display part and having a predetermined thickness in a thickness direction of the display part,
   wherein the functional part comprises an electronic module disposed on an upper surface of the functional part, and the electronic module comprises a driving module,
   wherein the driving module is configured to transmit a signal causing a state of the display part to change from a folded state to an unfolded state.

2. The electronic device of claim 1, wherein the functional part comprises:
   a first side surface adjacent to the display part;
   a second side surface opposite to the first side surface; and
   a connection surface connecting the second side surface and the upper surface and having a rounded shape.

3. The electronic device of claim 2, wherein an upper surface of the second folding area is disposed adjacent to the first side surface of the functional part when the first folding area and the second folding area are folded.

4. The electronic device of claim 1, wherein the first folding area is folded such that an upper surface of the first non-folding area faces an upper surface of the second non-folding area, and the second folding area is folded such that an upper surface of the third non-folding area is exposed to an outside.

5. The electronic device of claim 4, wherein the upper surface of the functional part is substantially parallel to an upper surface of the display part when the first folding area and the second folding area are unfolded.

6. The electronic device of claim 1, wherein the display part further comprises:
   a window defining an exterior of the electronic device and comprising a first non-folding portion corresponding to the first non-folding area, a second non-folding portion corresponding to the second non-folding area, a first folding portion corresponding to the first folding area, a third non-folding portion corresponding to the third non-folding area, and a second folding portion corresponding to the second folding area;
   a display module disposed under the window and comprising a first non-folding display portion corresponding to the first non-folding area, a second non-folding display portion corresponding to the second non-folding area, a first folding display portion corresponding to the first folding area, a third non-folding display portion corresponding to the third non-folding area, and a second folding display portion corresponding to the second folding area; and
   a housing disposed under the display module and accommodating the display module.

7. The electronic device of claim 6, wherein the functional part is connected to the housing.

8. The electronic device of claim 6, wherein the housing comprises a hinge structure corresponding to each of the first folding display portion and the second folding display portion, and the hinge structure operates from a fixed state to an open state by an operation of the driving module.

9. The electronic device of claim 1, wherein an upper surface of the third non-folding area defines an uppermost surface of the display part when the first folding area and the second folding area are folded.

10. The electronic device of claim 9, wherein the predetermined thickness of the functional part corresponds to a height from a lower surface of the functional part to the upper surface of the functional part, and the predetermined thickness is equal to or greater than a height from a lower surface of the first non-folding area to the upper surface of the third non-folding area when the first folding area and the second folding area are folded.

11. The electronic device of claim 1, wherein the electronic device is operated in one of a first state in which the first folding area and the second folding area are folded, a second state in which the first folding area and the second folding area are unfolded, and a third state in which the first folding area is unfolded and the second folding area is folded.

12. The electronic device of claim 1, wherein the functional part further comprises a control module to control an operation of the electronic module.

13. An electronic device comprising:
   a display part comprising a first non-folding area, a second non-folding area, a first folding area, a third non-folding area, and a second folding area, wherein the first folding area is disposed between the first non-folding area and the second non-folding area and folded to have a first radius of curvature, and the second folding area is disposed between the second non-folding area and the third non-folding area and folded to have a second radius of curvature greater than the first radius of curvature; and
   a functional part disposed adjacent to the first non-folding area of the display part and having a predetermined thickness in a thickness direction of the display part, the functional part comprising:
   an upper surface substantially parallel to at least a portion of an upper surface of the display part;
   a first side surface facing the display part and different from the upper surface;
   a second side surface opposite to the first side surface; and
   a connection surface connecting the second side surface and the upper surface of the functional part and having a rounded shape.

14. The electronic device of claim 13, wherein the display part further comprises:
   a window defining an exterior of the electronic device and comprising a first non-folding portion corresponding to the first non-folding area, a second non-folding portion corresponding to the second non-folding area, a first folding portion corresponding to the first folding area, a third non-folding portion corresponding to the third non-folding area, and a second folding portion corresponding to the second folding area;

a display module disposed under the window and comprising a first non-folding display portion corresponding to the first non-folding area, a second non-folding display portion corresponding to the second non-folding area, a first folding display portion corresponding to the first folding area, a third non-folding display portion corresponding to the third non-folding area, and a second folding display portion corresponding to the second folding area; and a housing disposed under the display module and accommodating the display module.

15. The electronic device of claim 14, wherein the functional part is connected to the housing.

16. The electronic device of claim 13, wherein an upper surface of the second folding area is disposed adjacent to the first side surface of the functional part when the first folding area and the second folding area are folded.

17. An electronic device comprising:

a display part comprising a first non-folding area, a second non-folding area, a first folding area, a third non-folding area, and a second folding area, wherein the first folding area is disposed between the first non-folding area and the second non-folding area and folded to have a first radius of curvature, and the second folding area is disposed between the second non-folding area and the third non-folding area and folded to have a second radius of curvature greater than the first radius of curvature; and a functional part disposed adjacent to the first non-folding area of the display part and having a predetermined thickness in a thickness direction of the display part, wherein the functional part comprises an electronic module disposed on an upper surface thereof, and the electronic device is operated in one of a first state in which the first folding area and the second folding area are folded, a second state in which the first folding area and the second folding area are unfolded, and a third state in which the first folding area is unfolded and the second folding area is folded, wherein in the third state, a relative location of the second non-folding area with respect to the third non-folding area is fixed to form an acute angle therebetween.

18. The electronic device of claim 17, wherein the electronic module comprises a driving module, and the first and second folding areas are unfolded from the first state by an operation of the driving module.

19. The electronic device of claim 17, wherein the first folding area is folded such that an upper surface of the first non-folding area faces an upper surface of the second non-folding area, and the second folding area is folded such that an upper surface of the third non-folding area is exposed to an outside.

* * * * *